United States Patent Office 3,084,040
Patented Apr. 2, 1963

3,084,040
EXTRACTION OF THORIUM FROM THORIUM CHLORIDE AND TO THE PRODUCTION OF MAGNESIUM-THORIUM ALLOYS
Frank Pitts, Manchester, England, assignor to Magnesium Elektron Limited, Clifton Junction, near Manchester, England
No Drawing. Filed Apr. 20, 1959, Ser. No. 807,347
Claims priority, application Great Britain Apr. 28, 1958
8 Claims. (Cl. 75—122.7)

This invention relates to the extraction of thorium from thorium chloride and to the production of magnesium-thorium alloys. The principal object of the invention is to provide an improved method of making a magnesium-thorium hardener alloy. Such an alloy is preferable for metallurgical reasons to metallic thorium as a means of introducing the finally required quantities of thorium (e.g. 0.1 to 10 percent) into magnesium and its alloys. It is known that thorium chloride may be prepared in admixture with alkali metal chlorides or alkaline earth metal chlorides or both, by chlorinating thorium oxide suspended in molten alkali metal chlorides or alkaline earth metal chlorides or a mixture of either or both in the presence of carbon and a catalyst, especially a salt of variable valency such as ferrous sulphide. If it is required to extract thorium from the product of this reaction it is customary to add first sufficient magnesium to precipitate the iron and subsequently to add to the decanted melt, an amount of magnesium just sufficient to precipitate the thorium. The precipitated thorium is separated by aqueous extraction, filtration and vacuum drying.

According to the present invention, the process consists in treating a fused mixture of chlorides with magnesium, said chlorides consisting essentially of thorium chloride and at least one chloride selected from the group consisting of the chlorides of the alkali metals and alkaline earth metals, the magnesium being added in quantity in considerable excess of that required to precipitate the thorium content of the melt so that a magnesium-thorium alloy is formed which contains at least 10 percent of magnesium. Alloys containing from 10 to 30 percent thorium can be made economically in this manner. This procedure is preferable to that in which thorium is first separated by aqueous extraction because it eliminates several stages in the process of making a magnesium-thorium hardener alloy. It also eliminates the hazard associated with handling thorium in the form of powder. The alloy may be used in the preparation of thorium-containing magnesium base alloys. Alkaline earth metal (including magnesium) chlorides may be used instead of or in addition to alkali metal chlorides. If desired the magnesium added to the melt may contain one or more other alloying ingredients (e.g. zinc or zirconium).

Conveniently the fused chlorides consist of at least 55 percent by weight of thorium chloride together with potassium chloride and sodium chloride.

For example, a fused mixture of 70 parts by weight thorium chloride, 16.5 parts sodium chloride and 13.5 parts potassium chloride is prepared in the following manner: A current of chlorine is passed through a silica tube into a fused melt of 16.5 parts sodium chloride and 13.5 parts potassium chloride at a temperature of 700° to 750° C. contained in a silica vessel. The chlorine inlet tube passes through a carbon block to serve as a reactant and which may be serrated to aid distribution of the chlorine immersed in the melt. A mixture of 52 parts thorium oxide and 1.5 parts ferrous sulphide is added gradually and chlorination is continued until all the thorium oxide is converted to thorium chloride. The aforesaid fused mixture results. This fused mixture is allowed to solidify and then reacted with 150 parts magnesium pre-heated to 700° to 750° C. The resulting alloy of thorium and magnesium is separated from the greater part of the less dense chlorides of sodium, potassium and magnesium by decantation of the chlorides. A sufficient quantity of calcium fluoride is then added to convert the residual chlorides to a semi-solid mass of density greater than that of the magnesium-thorium alloy which is then decanted.

In another example, the procedure described in the previous example is varied by substituting, for 1.5 parts ferrous sulphide, 0.5 part ferrous sulphide and 2.3 parts powdered graphite.

The thorium-magnesium hardener alloy obtained by this invention may contain 10 to 50 percent by weight of thorium, preferably 20 to 30 percent, and this can be added to magnesium for producing a magnesium base alloy containing thorium up to 8 percent by weight.

I claim:

1. A process for the production of magnesium-thorium alloys which consists in treating a fused chloride melt with chlorine in the presence of carbon, said chloride melt consisting of at least one chloride selected from the group consisting of the chlorides of alkali and alkaline earth metals, and while continuing such chlorination adding a mix of thorium oxide and a ferrous substance to obtain a fused mixture of thorium chloride with at least one chloride selected from the group of chlorides consisting of the chlorides of the alkali metals and alkaline earth metals, then adding magnesium in quantity in considerable excess of that required to precipitate the thorium content of the resulting melt, and next separating the resulting magnesium thorium alloy from the remainder of the melt.

2. A process as set forth in claim 1, wherein a sufficient quantity of calcium fluoride is added to the already separated magnesium-thorium alloy to convert the residual chlorides to a semi-solid mass of density greater than that of the magnesium-thorium alloy which is then decanted.

3. A process as set forth in claim 1, wherein the quantity of magnesium added is such as to produce an alloy containing 10 to 30 percent by weight of thorium.

4. A process as set forth in claim 1, wherein said fused mixture consists of 55 percent by weight of thorium chloride together with sodium and potassium chloride.

5. A process for the production of a magnesium base alloy which consists in producing a magnesium-thorium alloy according to claim 8, containing 10 to 50 percent thorium and mixing this with molten magnesium to produce an alloy containing thorium up to 8 percent.

6. A process for the production of magnesium-thorium alloys which consists in first treating a fused melt of 16.5 parts of sodium chloride and 13.5 parts of potassium chloride with chlorine in the presence of carbon, and while continuing such chlorination adding a mix of 52 parts of thorium oxide and 1.5 parts of ferrous sulfide to form a fused mixture having the following composition:

70 parts of thorium chloride,
16.5 parts of sodium chloride, and
13.5 parts of potassium chloride, then mixing this with 150 parts of molten magnesium, and then separating the resulting magnesium-thorium alloy.

7. A process for the production of magnesium-thorium alloys which consists in first treating a fused melt of 16.5 parts of sodium chloride and 13.5 parts of potassium chloride with chlorine in the presence of carbon and while continuing such chlorination adding a mix of 52 parts of thorium oxide, 0.5 part of ferrous sulfide, and 2.3 parts of powdered graphite to form a fused mixture having the following composition:

70 parts of thorium chloride,
16.5 parts of sodium chloride, and
13.5 parts of potassium chloride, then mixing this with 150 parts of molten magnesium, and then separating the resulting magnesium thorium alloy.

8. A process for the production of magnesium-thorium alloys which consists in treating a mixture of thorium oxide and at least one chloride selected from the group of chlorides consisting of the chlorides of the alkali metals and alkaline earth metals in fused condition with chlorine gas in the presence of carbon to obtain a second mixture of thorium chloride with at least one of said chlorides, and treating said second mixture with magnesium in quantity in considerable excess of that required to precipitate the thorium content of the melt so that a magnesium-thorium alloy is formed which contains at least 10 percent of magnesium.

References Cited in the file of this patent
UNITED STATES PATENTS

| | | |
|---|---|---|
| 2,678,267 | Saunders | May 11, 1954 |
| 2,782,116 | Spedding et al. | Feb. 19, 1957 |
| 2,847,299 | Keller et al. | Aug. 12, 1958 |